3,580,868
POLYISOCYANURATE RESIN AND FOAM FORMATION CATALYZED BY MANNICH BASES
Hans Joachim Diehr, Rudolf Merten, Helmut Piechota, and Konrad Uhlig, Leverkusen, Germany, assignors to Farbenfabriken Bayer Aktiengesellschaft, Leverkusen, Germany
No Drawing. Filed Dec. 27, 1968, Ser. No. 787,559
Claims priority, application Germany, Jan. 2, 1968,
P 17 20 769.1
Int. Cl. C08g 22/36, 22/46
U.S. Cl. 260—2.5                           7 Claims

ABSTRACT OF THE DISCLOSURE

Synthetic resins especially foams are prepared by polymerisation of compounds which contain more than one isocyanate group in the molecule, in the presence of Mannich base catalysts which are obtained by reaction between dimethylamine, formaldehyde and phenols which contain in the molecule at least one organic substituent which has at least 6 carbon atoms, optionally, in the presence of less than equivalent quantities of compounds which contain active hydrogen atoms and the usual auxiliary agents.

---

The polymerisation of compounds which contain aliphatic and aromatic isocyanate groups is already known and numerous variations of this procedure have been described. Alkaline catalysts are usually used in the polymerisation, and bring about conversion of the NCO groups into isocyanurate rings, the reaction being generally carried out in bulk or in solution either to produce polymers which contain definite proportions of isocyanurate rings or until all the NCO groups present have been reacted. If compounds which contain more than one isocyanate group in the molecule are used, these trimerisation reactions generally lead to formation of completely cross-linked, brittle material under conditions which cannot be controlled. Another difficulty encountered in these polymerisation reactions is that an incubation period is required and it is therefore practically impossible for this reaction to start at a definite time. The polymerisation of NCO groups, which is an exothermic reaction, can only be started at room temperature when very highly active catalysts are used, but in this case it is practically impossible to control the reaction. Polymerisation reactions of this type are therefore generally carried out using weak (basic) activators at elevated temperatures. Furthermore, isocyanate polymerisation reactions using phenolic Mannich bases which are derived from phenol or thiophenol, which may be substituted by halogen or by alkyl radicals containing 1 to 5 carbon atoms have already been described. In particular, 2,4,6-tris dimethylaminomethyl-phenol has been used. This compound is particularly effective when used together with an oxide to achieve sufficiently high activity. The reaction products obtained in this case, however, have a very strong smell of amine which makes their use impracticable. Moreover, the amine components used cause the isocyanate polymerisation reaction to proceed insufficiently smoothly so that the product obtained is commercially unsatisfactory in every respect.

It has now surprisingly been found that synthetic resins based on polyisocyanates can be obtained with desirable commercial properties, if a compound which contains more than one isocyanate group is polymerised, if desired in the presence of a blowing agent and if desired in the presence of less than equivalent quantities of compounds which contain active hydrogen atoms, optionally with the addition of stabilizers and the usual auxiliary agents, using, as catalysts, a Mannich base of a phenol which is obtained from dimethylamine and formaldehyde and a phenol which is capable of condensation of the type and which contains at least one alkyl, alkenyl, cycloalkyl, aryl or aralkyl radical which contains at least 6 carbon atoms and preferably 6 to 18 carbon atoms.

Surprisingly, these new compounds exhibit considerably superior catalytic activity to the compounds already described, even if their amine content, which can normally be regarded as a measure of the activating effect, is considerably reduced.

This superiority manifests itself not only in the preliminary step but also, for example, during the foaming which is carried out during the actual process, as will be indicated in detail in the examples. It is found that these catalysts become much more evenly distributed in the polyisocyanate which is to be polymerised, and owing to this better distribution, may load to a more uniform and more rapid polymerisation reaction taking place. This effect can be achieved especially in the case of phenols which contain a very long aliphatic radical, for example an isooctyl, isononyl or isodedecyl group, or if a cycloaliphatic or araliphatic substituent is present, e.g. a cyclohexyl, benzyl or 2-phenyl-propyl-(2) group. In many cases the o-substituted types are superior to the corresponding p-compounds, obviously due to the blocking effect on the o-dimethylaminophenyl group which is more highly hydrophilic and less compatible with the isocyanate group.

It is therefore an object of this invention to provide a process for the production of synthetic resins. Another object of this invention is to provide a process for the production of synthetic resins which contain isocyanurate groups. A further object of this invention is to provide foams which contain isocyanurate groups. The foregoing objects and others which will become apparent from the following description are accomplished in accordance with the invention generally speaking by providing a process for the preparation of synthetic resins which contain isocyanurate groups which comprises polymerisation of compounds which contain more than one isocyanate group in the molecule, in the presence of Mannich base catalysts which are obtained by reaction between dimethylamine, formaldehyde and phenols which contain in the molecule at least one organic substituent which has at least 6 carbon atoms, optionally in the presence of less than equivalent quantities of compounds which contain active hydrogen atoms and the usual auxiliary agents.

An especial embodiment of this process comprises the use of blowing agents by which the synthetic resins are obtained as foams.

As starting material according to the invention any suitable aliphatic, cycloaliphatic, araliphatic and aromatic polyisocyanate can be used. Preferably diisocyanates, triisocyanates and tetraisocyanates are employed and of these polyisocyanates the aromatic polyisocyanates are preferred. Examples of the suitable polyisocyanates are the following: alkylene diisocyanates such as tetra- and hexamethylene diisocyanate; arylene diisocyanates and their alkylation products such as phenylene diisocyanates, naphthylene diisocyanates, diphenylmethane diisocyanates, toluylene diisocyanates, di- and tri-isopropylbenzene diisocyanates and triphenylmethane triisocyanates; triesters of p-isocyanatophenyl-thiophosphoric acid; triesters of p-isocyanatophenyl-phosphoric acid; aralkyl diisocyanates such as 1-(isocyanatophenyl)-ethyl isocyanate and xylene diisocyanates, as well as polyisocyanate which may be substituted by a great variety of different substituents such as alkoxy groups, nitro groups and chlorine or bromine atoms; furthermore, polyisocyanates which have been modified with less than equivalent quantities of polyhydroxy compounds such as trimethylolpropane, hexanetriol, glycerol or butanediol may be used. The polyisocyanates which can be prepared according to Belgian patent specification 714,850 may also be used in the present invention. A polyisocyanate which is particularly suitable is that which can be prepared by aniline formaldehyde condensation followed by phosgenation. Further examples of suitable polyisocyanates are those polyisocyanates which are masked with phenols, oximes or bisulphite, as well as acetal-modified isocyanates, polymerised isocyanates containing isocyranurate rings, and high molecular weight polyisocyanates which can be prepared by reacting monomeric polyisocyanates with high molecular weight compounds which contain reactive hydrogen atoms, preferably high molecular weight polyhydroxyl compounds, polycarboxyl compounds and polyamino compounds. Mixtures of different isocyanates may, of course, also be used, in which case monoisocyanates such as phenyl isocyanate or naphthylisocyanate may also be included.

The polymerisation reaction of the isocyanate compound may be carried out in the presence of compounds which contain active hydrogen atoms. Water is preferably used, and, if present, it may serve as an additional blowing agent. However, other organic compounds which contain several active hydrogen atoms may also be employed. Suitable such compounds, which may be used individually or in admixture, are polyamines or amino alcohols, or preferably, lower (molecular weights up to 800) and higher (molecular weights from 800 to 10,000) molecular weight hydroxy compounds or mixtures thereof. A wide variety of these compounds are commonly used in the production of polyurethane resins. One may also use the usual monohydric and polyhydric alcohols, such as butanol, cyclohexanol, benzyl alcohol, ethylene glycol, propylene glycol, glycerol, trimethylol propane and their addition products with alkylene oxides such as ethylene oxide and/or propylene oxide. Suitable polyfunctional starting components also include the condensation products of the above-mentioned polyhydric alcohols with polycarboxylic acids such as adipic, sebacic, maleic, phthalic or terephthalic acid. Numerous compounds of this type have been described in "Polyurethanes, Chemistry and Technology," volumes I and II, Saunders-Frisch, Interscience Publishers, 1962 and 1964 and in Kunststoffhandbuch, vol. VII, Vieweg-Hochtlen, Publishers Carl-Hanser-Verlag, Munich, 1966. The process of the invention is largely carried out in the absence of compounds which contain active hydrogen atoms.

Homogeneous shaped articles, lacquers, coatings, foams and cellular structures can be obtained by the process of the invention. The process is preferably used in the production of foams.

A blowing step to produce the foams is carried out using water or additional blowing agents. Suitable blowing agents, part from the compounds which decompose to liberate gases such as nitrogen, e.g. azo compounds or sulphonyl azides, include, in particular, low boiling hydrocarbons such as ethane, propane, hexane or heptane and their halogenation products, e.g. halogenated methanes or ethanes, chlorofluoromethanes, ethylene dichloride and vinylidene chloride.

The usual emulsifiers and foam stabilisers may be used as additives to facilitate the mixing and foaming reactions. These additives include higher alkyl or aryl sulphonic acids and their salts, sulphuric acid esters of castor oil or of ricinoleic acid and their salts, oleic acid salts or stearic acid salts, silicone oils which contain basic groups, and mixed condensation products which contain siloxane and alkylene oxide groups.

The catalysts used according to the invention are Mannich bases of dimethylamine, formaldehyde and phenols which contain at least one alkyl, alkenyl, cyclohexyl, aralkyl or aryl group which has at least 6 carbon atoms. The preparation of these catalysts is known in the art and described, for instance, in Hellmann, "α-Aminoalkylierung," Verlag Chemie, 1960. When carrying out the Mannich reaction to prepare the catalysts, the phenols should have, in addition, at least one free o- and/or p-position which is capable of undergoing condensation. The commercial mixtures which are obtained from the alkylation of phenol with suitable olefines, alcohols or halogen compounds (under acid conditions), which contain one or two of the above-mentioned radicals, are generally used, and mixture of o- and p-substituted products may, of course, also be used. The only amine component which is of any interest is dimethylamine because the higher secondary amines cause a great reduction in the activity. Similarly, only formaldehyde may be used as oxo component.

Any suitable phenols which contain at least 6 and preferably 6 to 18 carbon atoms can be used according to the invention, for example, o- and/or p-substituted alkyl phenols, e.g. 4-isooctyl-, 4-isononyl-, 4-isododecyl-, 4-decyl-, 4-n-octyl-, 4-oleyl-, 4-stearyl- and 4-lauryl phenol as well as the corresponding 2-derivatives and suitable 2,4-dialkyl phenol, 2- and 4-cyclohexylphenol, 4,4'-dihydroxy-diphenyl-(2,2)-propane, 4-hydroxy-diphenyl-(2,2)-propane or 4-hydroxy-diphenyl. Phenols which contain at least one cyclohexyl group as well as phenols which contain at least one alkyl radical with at least 8 to 12 carbon atoms are particularly preferred. The compounds may also carry additional substituents, e.g. a hydroxyl group, as in the case of 4,4'-dihydroxydiphenyl propane.

Mono- and bis-phenylethylphenols such as those obtained, for example, by acid catalysed addition of phenol derivatives such as styrene, alkyl styrenes or aromatic chlorostyrenes to phenol may also be advantageously used. Mono- or dialkyl phenols which contain 8, 9 or 12 carbon atoms in the alkyl radical are also particularly preferred. The proportions of reactants used in the preparation of the catalysts should be so adjusted that at least one molecule of the secondary amine and at the most a molar quantity of formaldehyde corresponding to this quantity of amine are used for one molecule of phenol.

The upper limit of the amount of amine and hence of the amount of formaldehyde is determined by the number of CH bonds in the o- and/or p-position in the phenol, which are still available for undergoing the Mannich reaction. The condensation of phenol with a secondary amine and formaldehyde may be carried out, e.g. as described in U.S. patent specifications Nos. 2,033,092 and 2,220,834.

Further details can be found in the examples which follow.

Apart from the catalysts to be used according to the invention, one may also include the usual catalysts employed in isocyanate chemistry, e.g. organometallic compounds such as lead or tin salts, inorganic and organic polybasic metal salts and tertiary amines such as dimethylbenzylamine or endoethylene piperazine. IR spectroscopic analyses show that substantial proportions of carbodiimide structures, depending on the reaction conditions, especially the reaction temperature, are generally formed in the foam products, and the proportion of carbodiimide structures in the foams can be increased by use of the known catalysts used in the production of carbodiimides, especially tetravalent and pentavalent organic phosphorus compounds such as phospholines, phospholine oxides, tertiary phosphines, and (cyclic) esters, amides and ester amides of phosphorous and phosphoric acid. Further details relating to emulsifiers and catalysts can be found, e.g. in "Polyurethanes, Chemistry and Technology," vols. I and II, Saunders-Frisch, Interscience Publishers, 1962 and 1964.

The production of the foams is carried out in the usual well-known manner, preferably mechanically, by mixing together the reactants and then pouring them out into a suitable mould. The quantity of blowing agents used is determined by the desired bulk density. One generally uses between 1 and 100, preferably between 5 and 50 parts by weight of a fluorochloromethane or a corresponding quantity of some other blowing agent, based on the isocyanate component. It is generally desired to obtain bulk densities of between 15 and 200 kg./m.$^3$ or more, preferably between 20 and 200 kg./m.$^3$.

The quantity of compounds which contain reactive hydrogen atoms should be so chosen that there will still be a sufficient quantity of free isocyanate groups available for the polymerisation reaction. Preferably, the quantity should be so chosen that at least 50% and preferably more than 70% of the total amount of isocyanates put into the process will be available for the polymerisation reaction. The quantity of catalyst used depends upon its structure, and there is no relationship between its nitrogen content and its catalytic activity. The activity test described below gives some idea of the amounts used. One uses between 0.5 and 15% by weight of catalyst component, based on the isocyanate component.

In addition to the components used for the production of the synthetic resin, the usual auxiliary agents such as pigments, dyes, plasticisers and flameproofing agents such as antimony compounds, phosphorus compounds or halogen compounds may be added.

The production of lacquers and solid products is similarly carried out by methods which are already known in the art. Lacquers are formed with solvents and are applied to all sorts of different substrates such as wood, glass, metal or paper, if desired, after the addition of the usual auxiliary agents for lacquers and pigments. Condensation may also be completed at elevated temperatures.

The solid products are produced by pouring the polyisocyanates to which the catalyst has been added into moulds, if desired, with cooling or subsequent heating.

IR spectroscopic investigation of the resulting synthetic resins, lacquers, coatings and foams indicates high proportions of isocyanurate rings in addition to small proportions of carbodiimide groups.

(A) DETERMINATION OF THE ACTIVITY 25 parts by weight of toluylene-2,4-diisocyanate are cooled to 20° C., and 0.1 ml. of a catalyst (generally liquid) is added with shaking. The mixture is then shaken for another 5 seconds and the rate of change of temperature is determined. For example, the times taken for the mixtures to reach temperatures of 50 and 75° C. may be determined. In such an activity test, 2,4,6 - tris - dimethylaminomethyl-phenol reaches 50° C. after 175 seconds and 75° C. after 200 seconds.

(B) PREPARATION OF THE CATALYST WHICH IS TO BE USED

General method of procedure.—The phenol and the theoretical quantity of dimethylamine, the latter in the form of a 25% aqueous solution, are introduced into the reaction vessel at about 25° C. and the necessary quantity of formaldehyde, generally in the form of a 40% aqueous solution, is then added dropwise over a period of 30 minutes. The reaction mixture is then heated for about one hour at 30° C. and the temperature is then increased in the course of a further 2 hours to 80° C.

After 2 hours at 80° C., the organic and aqueous phases are separated by the addition of sodium chloride and the organic phase is concentrated by evaporation at 70° C./12 mm. Hg. In some cases, the organic phase must be freed from inorganic constituents by filtration after the evaporation step. Alternatively, separation of the aqueous phase by the addition of sodium chloride may be omitted and the combination may be directly evaporated at 70 to 80° C./12 mm. Hg.

Details of the quantities to be used, yields and properties of the reaction products are shown in the following table.

TABLE

| No. | Parts by weight of phenol | Parts by weight of dimethylamine (in 25% aqueous form) | Parts by weight CH$_2$O (in the form of a 40% aqueous solution) | Parts by weight, yield | $cP_{25}$ | Activity, seconds, after— 50° C. | 75° C. |
|---|---|---|---|---|---|---|---|
| B 1 | 524 p-isododecylphenol | 200 | 120 | 641 | 351 | 35 | 45 |
| B 2 | 440 p-isononylphenol [1] | 200 | 120 | 567 | 212 | 37 | 50 |
| B 3 | 412 p-(1,1,3,3-tetramethyl-butyl)-phenol. | 200 | 120 | 502 | 602 | 37 | 50 |
| B 4 | 352 p-cyclohexylphenol | 200 | 120 | 536 | 645 | 39 | 52 |
| B 5 | 368 4-hydroxy-diphenylmethane | 200 | 120 | 496 | | 38 | 60 |
| B 6 | 424 2-phenyl-2-(4-hydroxyphenyl)-propane. | 200 | 120 | 582 | 1,909 | 38 | 50 |
| B 7 | 352 o-cyclohexylphenol | 90 | 60 | 440 | 363 | 18 | 50 |
| B 8 | 352 p-cyclohexylphenol | 90 | 60 | 463 | 594 | 155 | 165 |
| B 9 | 440 p-isononylphenol [1] | 90 | 60 | 529 | 218 | 23 | 26 |

[1] 86% p- and 14% o-2-nonylphenol.

B 10: 0.5 parts by weight of borontrifluoride etherate are added to 94 parts by weight of phenol, and 104 parts by weight of styrene are then added dropwise at a rate adjusted to the rate of the exothermic reaction. After the addition of the styrene to the phenol, the reaction mixture is stirred for 2 hours at 80° C., and the crude phenylethylphenol obtained is cooled to 30° C. 360 parts by weight of a 25% aqueous dimethylamine solution are then added and 60 parts by weight of formaldehyde are added dropwise in the form of an approximately 40% solution, at 30° C. The reaction mixture is then kept at 30° C. for another hour, and the product is worked up as described above under the heading of general method of procedure.

Yield: 278 parts by weight, $cP_{25}$=2,100, 8.2% N, Activity test: 50° C. after 45 seconds, 75° C. after 2 minutes.

B 11: 1248 parts by weight of styrene are first added to 56.4 parts by weight of phenol in the presence of 4 parts by weight of borontrifluoride etherate at 50° C. by the method described for B 10, and the resulting substituted phenol is then converted into the Mannich base by reaction with 1080 parts by weight of a 25% aqueous dimethylamine solution and 180 parts by weight of formaldehyde in the form of a 40% aqueous solution. 2090 parts by weight of a reaction product containing 3.6% N and having a viscosity of $cP_{25}$=115,000 are obtained.

B 12: 416 parts by weight of styrene are first added to 376 parts by weight of phenol in the presence of 2 parts by weight of borontrifluoride etherate in the manner described for B 10. Conversion into the Mannich base is then carried out using 720 parts by weight of a 25% dimethylamine solution and 180 parts by weight of formaldehyde in the form of a 40% aqueous solution. 1019 parts by weight of the Mannich base are obtained.

5.3% N, $cP_{25}$=14,175.

Activity test: 50° C. after 140 seconds, 75° C. after 165 seconds.

B 13: 208 parts of styrene are added at 50° C. to 440 parts by weight of commercial isononylphenol (about 90% p- and about o-2-nonylphenol) to which 2 parts by weight of borotrifluoride etherate had been added. The reaction mixture is subsequently heated for 2 hours at 80° C., and 715 parts by weight of the corresponding Mannich base are then prepared by the general method of procedure indicated above, using 360 parts by weight of 25% dimethylamine solution and 60 parts by weight of formaldehyde in the form of a 40% aqueous solution. $cP_{25}=4150$. In the activity test, a temperature of 50° C. is reached after 56 seconds.

PROCESS ACCORDING TO THE INVENTION (A) 100 parts by weight of a polyphenylmethylene polyisocyanate obtained by aniline formaldehyde condensation followed by phosgenation are added to a mixture of 6 parts by weight of catalyst, 15 parts by weight of monofluorotrichloromethane and 1 part by weight of a polysiloxane-polyether copolymer, and the components are intensively mixed with an electrically driven stirrer and poured into prepared moulds formed of packing paper. The reaction times and properties of the polyisocyanurate foams obtained are shown in Table 1.

(B) 100 parts by weight of a polyphenylmethylene polyisocyanate obtained by aniline formaldehyde condensation followed by phosgenation are stirred together with a mixture of 6.0 parts by weight of catalyst, 20.0 parts by weight of monofluorotrichloromethane, 1.0 part by weight of a polysiloxanepolyether copolymer and 10.0 parts by weight of a sucrose/propylene oxide polyether of OH number 380. The reaction mixture is then poured into paper moulds.

The reaction times and properties of the foams are shown in Table 2.

Examples 27–29

1000 parts by weight of a polyester of adipic acid and diethylene glycol of acid number 2.0 and OH number 54.2 are introduced dropwise into 348 parts by weight of toluylene diisocyanate (80% 2,4- and 20% 2,6-isomer) at 100° C. A prepolymer which has an NCO content of 9.1% is obtained after subsequently heating the mixture for 2 hours at 80° C.

Example 27

0.5 g. of the catalyst obtained according to B 2 are added at 40° C. to 50 g. of the prepolymer prepared in the manner described above, and the mixture is then condensed to completion in a closed vessel at 50° C. A solid, cross-linked synthetic resin is obtained.

Example 28

25 parts by weight of 4,4′ - diamino-diphenylmethane and 15 parts by weight of a chlorinated diphenyl are heated to 60° C. and 1 part by weight of the catalyst obtained according to B 3 is added. After complete condensation at 50° C., a solid, practically non-combustible, homogeneous synthetic resin of high strength is obtained.

Example 29

25 parts by weight of the adduct obtained by addition of 3 mols of toluylene diisocyanate (65% 2,4- and 35% 2,6-isomer) to 1 mol of trimethylol propane are dissolved in 25 parts by weight of ethyl acetate. After the addition of 5 parts by weight of a polyester which has been obtained from equal parts of phthalic acid, adipic acid and trimethylol propane and which contains 9.8% of OH groups, 2.5 parts by weight of the catalyst prepared according to B 7 are added. The mixture prepared in this way is applied as a coating to different substrates, e.g. metal plates. The mixtures are cured by subsequently heating them for 2 hours at 80° C., and a substantially flame-resistant coating is obtained.

What is claimed is:

1. A process for the production of synthetic resins which contain isocyanurate groups which comprises polymerization of compounds which contain more than one isocyanate group in the molecule, in the presence of Mannich base catalysts which are obtained by reaction between dimethylamine, formaldehyde and phenols which contain in the molecule at least one substituent containing from 6 to 18 carbon atoms, said substituents being directly attached to the benzene ring and being selected from the group consisting of alkyl, alkenyl, cycloalkyl, aryl and aralkyl radicals.

2. The process of claim 1 in which blowing agents are used.

3. The process of claim 1 wherein the phenol is substituted by at least one cyclohexyl group.

TABLE 1

| Example | Catalyst | $t_R$ | $t_A$ | $t_S$ | $t_K$ | Surface | Cellular nature | Bulk density, kg./m.³ |
|---|---|---|---|---|---|---|---|---|
| 1 | B 2 | 35 | 45 | 65 | 50 | Slightly brittle | Medium fine | 41 |
| 2 | B 3 | 30 | 45 | 70 | 55 | do | do | 41 |
| 3 | B 4 | 35 | 90 | 150 | 255 | do | Very fine | 49 |
| 4 | B 1 | 45 | 60 | 105 | 85 | do | Medium fine | 44 |
| 5 | B 5 | 40 | 90 | 150 | 240 | do | do | 46 |
| 6 | B 6 | 35 | 65 | 75 | 155 | do | Fine | 42 |
| 7 | B 7 | 30 | 45 | 65 | 50 | do | do | 53 |
| 8 | B 8 | 60 | 300 | 300 | 720 | do | Very fine | 47 |
| 9 | B 9 | 30 | 50 | 70 | 60 | do | do | 50 |
| 10 | B 10 | 35 | 70 | 125 | 180 | do | Medium fine | 49 |
| 11 | B 11 | 60 | 210 | 240 | 420 | do | do | 70 |
| 12 | B 12 | 35 | 75 | 90 | 120 | do | Very fine | 46 |
| 13 | B 13 | 30 | 90 | 120 | 105 | Brittle | Coarse | |

TABLE 2

| Example | Catalyst | $t_R$ | $t_A$ | $t_S$ | $t_K$ | Surface | Cellular nature | Bulk density, kg./m.³ |
|---|---|---|---|---|---|---|---|---|
| 14 | B 1 | 60 | 90 | 125 | 110 | Less brittle | Very fine | 44 |
| 15 | B 2 | 60 | 90 | 120 | 110 | do | do | 45 |
| 16 | B 3 | 50 | 60 | 110 | 100 | do | do | 39 |
| 17 | B 4 | 60 | 125 | 180 | 300 | do | do | 43 |
| 18 | B 5 | 60 | 200 | 270 | 400 | do | Fine | 45 |
| 19 | B 6 | 25 | 50 | 85 | 70 | do | Very fine | 43 |
| 20 | B 7 | 45 | 70 | 105 | 95 | do | do | 53 |
| 21 | B 8 | 60 | (¹) | (¹) | (¹) | do | Fine | 88 |
| 22 | B 9 | 60 | 95 | 130 | 140 | do | Medium fine | 42 |
| 23 | B 10 | 40 | 95 | 150 | 180 | Tough | Fine | 47 |
| 24 | B 11 | 60 | 360 | 415 | 920 | Less brittle | do | 160 |
| 25 | B 12 | 50 | 125 | 185 | 370 | do | Very fine | 38 |
| 26 | B 13 | 60 | 170 | 200 | 420 | do | Fine | |

¹ For about 2 hours.

NOTE.—$t_R$=stirring time; $t_A$=setting time (internal); $t_S$=rising time; $t_K$=setting time (external). Assessment of surface is carried out 24 hours after production.

4. The process of claim 1 wherein the phenol is substituted by at least one alkyl radical which contains at least 8 to 12 carbon atoms.

5. The process of claim 1 wherein the phenol is a mono- or bis-phenylethylphenol which is prepared by acid catalyzed addition of styrene, alkyl styrene and aromatic chlorostyrene to phenol.

6. The process of claim 1 wherein the phenol is a mono- or dialkylphenol which contains 8, 9 or 12 carbon atoms in the alkyl radical.

7. The process of claim 1 wherein the polymerization is carried out in the presence of less than an equivalent amount of compounds containing active hydrogen atoms reactive with isocyanate groups.

References Cited
UNITED STATES PATENTS

| | | | |
|---|---|---|---|
| 2,978,449 | 4/1961 | France et al. | 260—248 |
| 3,222,303 | 12/1965 | Hampson | 260—2.5 |
| 3,367,934 | 2/1968 | Tate et al. | 260—248 |

DONALD E. CZAJA, Primary Examiner

H. S. COCKERAM, Assistant Examiner

U.S. Cl. X.R.

260—18, 22, 77.5